US008650100B1

(12) United States Patent  (10) Patent No.: US 8,650,100 B1
Miller et al.  (45) Date of Patent: Feb. 11, 2014

(54) ITEM CAPACITY RISK

(71) Applicant: Target Brands, Inc., Minneapolis, MN (US)

(72) Inventors: Lisa Anne Miller, Roseville, MN (US); Earl Stanley Sun, Chaska, MN (US); John Walbrun, Eden Prairie, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 13/680,903

(22) Filed: Nov. 19, 2012

(51) Int. Cl.
*G06Q 10/08* (2012.01)

(52) U.S. Cl.
USPC ............. 705/28; 705/22; 705/301; 705/348; 705/7.11; 705/36 R; 709/224; 340/5.92; 235/385

(58) Field of Classification Search
USPC ................... 705/28, 22, 301, 348, 34, 7.11; 235/385; 340/10.42
See application file for complete search history.

(56) References Cited

U.S. PATENT DOCUMENTS

| | | | |
|---|---|---|---|
| 4,636,950 A * | 1/1987 | Caswell et al. | 705/28 |
| 6,341,269 B1 | 1/2002 | Dulaney et al. | |
| 6,609,101 B1 | 8/2003 | Landvater | |
| 6,671,578 B1 * | 12/2003 | D'Amelio et al. | 700/225 |
| 7,257,552 B1 * | 8/2007 | Franco | 705/28 |
| 7,734,495 B2 | 6/2010 | Klaubauf et al. | |
| 7,853,491 B2 * | 12/2010 | Wittmer et al. | 705/28 |
| 8,032,406 B2 | 10/2011 | Ouimet | |
| 8,234,004 B2 * | 7/2012 | Grissom | 700/214 |
| 2001/0047293 A1 * | 11/2001 | Waller et al. | 705/10 |
| 2003/0195791 A1 | 10/2003 | Waller et al. | |
| 2007/0027745 A1 * | 2/2007 | Ouimet | 705/10 |
| 2008/0208719 A1 * | 8/2008 | Sharma et al. | 705/29 |
| 2009/0259509 A1 * | 10/2009 | Landvater | 705/8 |
| 2010/0138276 A1 * | 6/2010 | Bildmayer et al. | 705/10 |
| 2010/0138281 A1 | 6/2010 | Zhang et al. | |
| 2010/0161383 A1 * | 6/2010 | Butler | 705/10 |
| 2011/0208620 A1 * | 8/2011 | Mccormick | 705/28 |

OTHER PUBLICATIONS

Broekmeulen, et al., "Excess shelf space in retail stores: An analytical model and empirical assessment", Technische Universiteit Eindhoven, Faculty of Technology management, 2004, 26 pps.
Borin, et al., "A Model for Determining Retail Product Category Assortment and Shelf Space Allocation", Decision Sciences, vol. 25, No. 3, May 1994, 26 pps.
Hansen, et al., "Retail Shelf Allocation: A Comparative Analysis of Heuristic and Meta-Heuristic Approaches", Journal of Retailing, 86 (1, 2010), pp. 94-105.

(Continued)

*Primary Examiner* — Vanel Frenel
(74) *Attorney, Agent, or Firm* — Shumaker & Sieffert, P.A.

(57) ABSTRACT

The risk of losing sales of an item in a retail store due to the item not being on the retail store's shelves for customers to purchase is reduced. An item an item at a retail store may be identified as being at risk based at least in part on a sales volatility of the item and on a frequency of the item selling beyond its sales floor capacity within a day. A minimum number of facings for the item in the retail store may be determined based at least in part on an average daily capacity of the item, an average number of facings for the item, and a specified amount of daily sales of the item. The determined minimum number of facings for the item in the retail store may be reported.

20 Claims, 7 Drawing Sheets

(56) References Cited

OTHER PUBLICATIONS

"Reducing Out-of-Stocks with More Effective Planograms", Retail Solutions, Inc., 2009, 4 pps.

Office Action from Canadian Patent Application No. 2,798,863, mailed May 2, 2013 (4 pages).
Office Action from Canadian Patent Application No. 2,798,863, mailed Sep. 9, 2013 (4 pages).

* cited by examiner

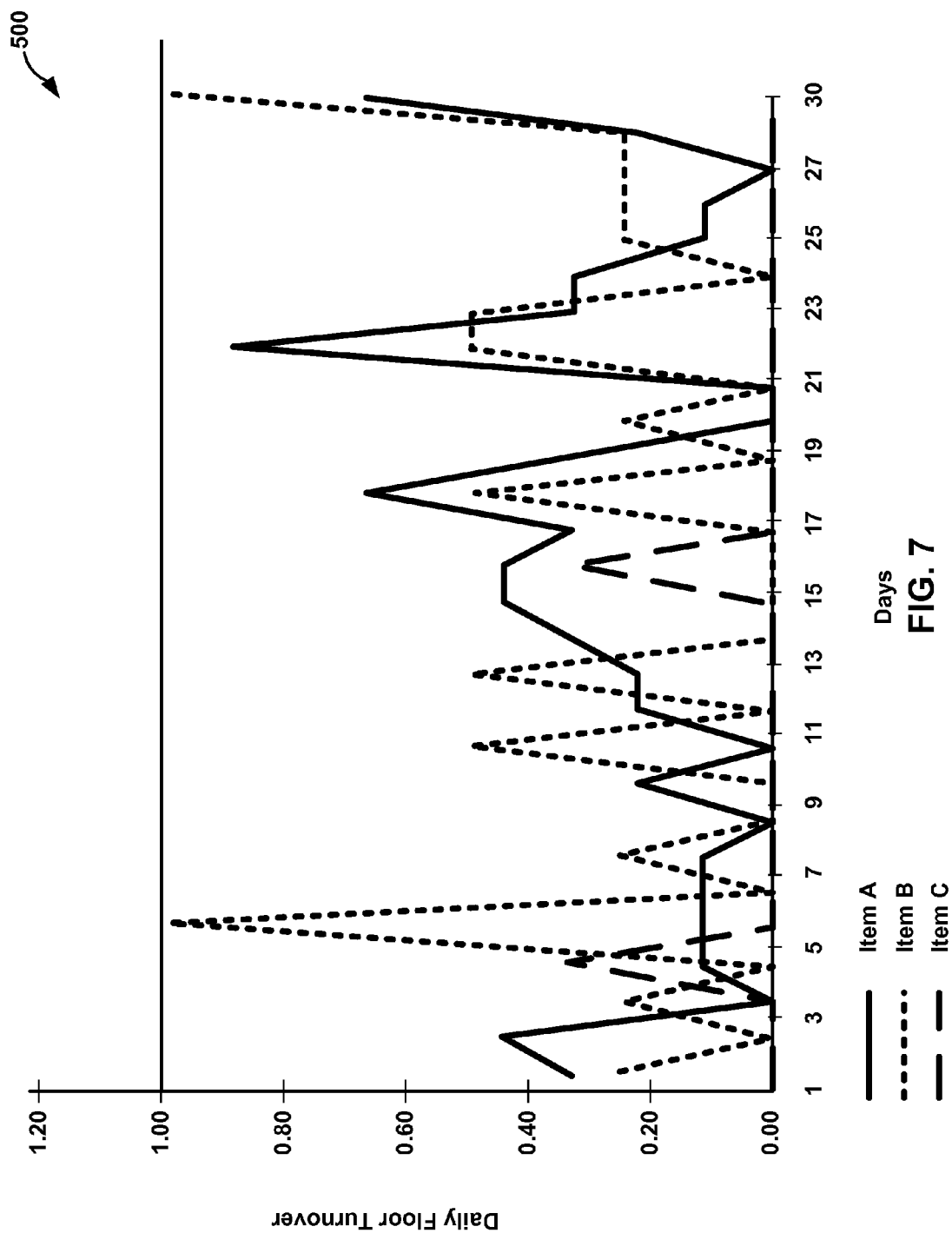

ITEM CAPACITY RISK

TECHNICAL FIELD

The disclosure relates to shelf space allocation for an item in a retail setting.

BACKGROUND

In a retail store, if an item is not available on the sales floor while the retail store is open to customers, there is a risk of losing sales of the item because a customer that wishes to purchase the item is not able to find the item on the sales floor. The risk of losing the sale may exist even if the item is stocked in the stockroom of the retail store, because the customer may not be able to or wish to wait for the item to be restocked on the sales floor. During peak sales days, losing sales of an item because the item's shelf space is empty may negatively affect the retail store's financial bottom line.

SUMMARY

This disclosure is directed to techniques for reducing the risk of losing sales of an item in a retail store due to the item not being on the retail store's shelves for customers to purchase. In one example, the sales floor capacity of an item may place the item at risk of being oversold, e.g., in one day. The risk of losing sales due to an imbalance between daily demand and floor capacity of an item may be expressed as, e.g., the "item capacity risk."

In one example according to this disclosure, a method includes identifying, by a computing system, an item at a retail store that is at risk of not being available for purchase by a customer at the retail store based at least in part on a sales volatility of the item in a past period of time and on a frequency of the item selling beyond its sales floor capacity within a day in the past period of time, determining, by the computing system, a minimum number of facings for the item in the retail store for a specified period of time based at least in part on an average daily capacity of the item in the past period of time, an average number of facings for the item in the past period of time, and a specified amount of daily sales of the item, and reporting, by the computing system, the determined minimum number of facings for the item in the retail store.

In another example, a computer-readable storage medium includes instructions that, when executed on at least one programmable processor, causes the programmable processor to perform operations. The operations performed by the programmable processor include calculating a risk index for an item at a retail store that is indicative of a risk that the item will not be available for purchase by a customer at the retail store, determining a minimum number of facings for the item in the retail store for a specified period of time based at least in part on the risk index for the item, an average daily capacity of the item in the past period of time, an average number of facings for the item in the past period of time, and a specified amount of daily sales of the item, and changing a planned number of facings for the item at the retail store to at least the determined minimum number of facings if the risk index is equal to or greater than a threshold risk index value.

In another example, a system includes at least one processor, a risk estimation module, a facings determination module, and a report generation module operable on the at least one processor. The risk estimation module is configured to identify an item at a retail store that is at risk of not being on store shelves of the retail store during certain days of a specified period of time based at least in part on a risk index indicative of a risk that demand for the item will exceed the number of items on store shelves of the retail store. The facings determination module is configured to determine a minimum number of facings for the item in the retail store for a specified period of time based at least in part on the risk index, an average daily capacity of the item in the past period of time, an average number of facings for the item in the past period of time, and a specified amount of daily sales of the item. The report generation module is configured to generate a report comprising the determined minimum number of facings for the item in the retail store and a recommendation to change a number of facings for the item at the retail store to at least the determined minimum number of facings if the risk index is equal to or greater than a threshold risk index value.

The details of one or more aspects of the disclosure are set forth in the accompanying drawings and the description below. Other features, objects, and advantages of the disclosure will be apparent from the description and drawings, and from the claims.

BRIEF DESCRIPTION OF DRAWINGS

FIG. 7 is a graph illustrating an example daily floor turnover for items at a retail store during a period of time according to some aspects of the present disclosure.

DETAILED DESCRIPTION

Figure 1:
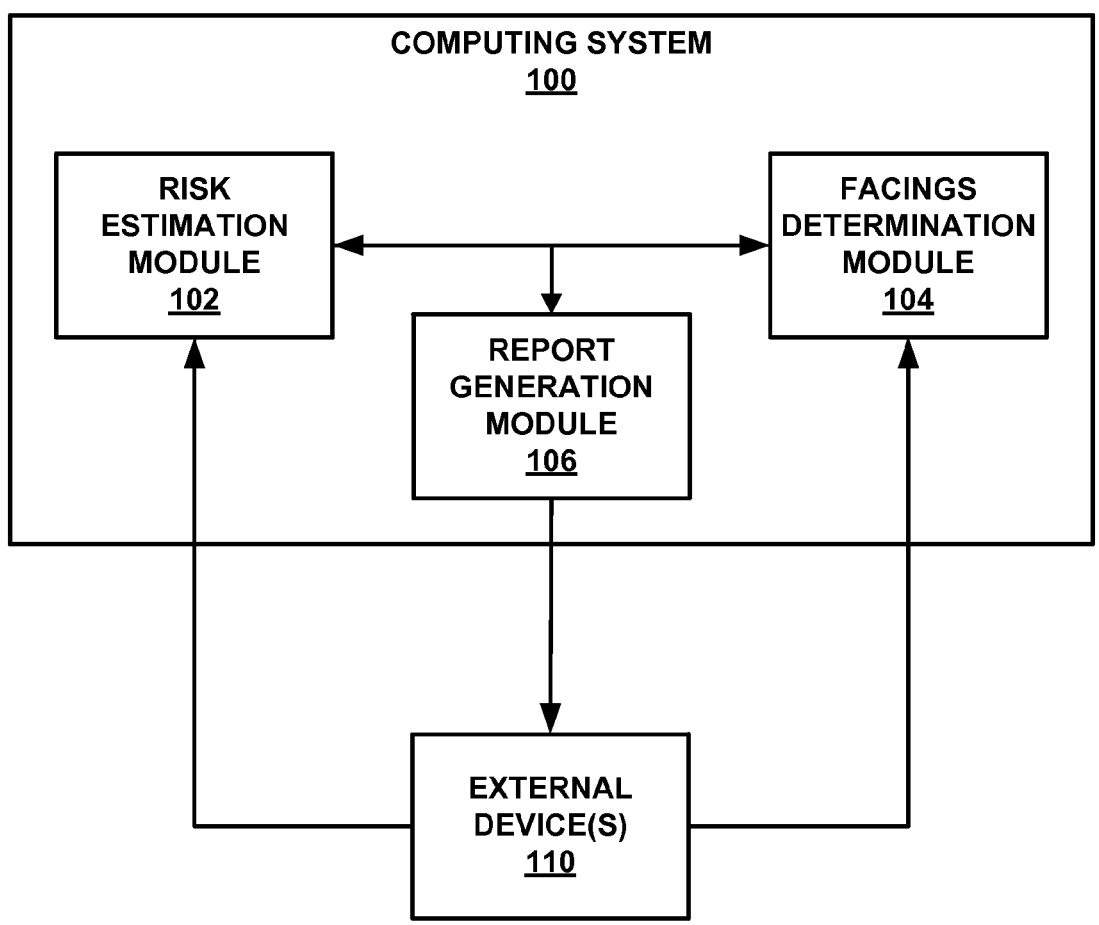
FIG. 1 is a block diagram illustrating an example computing system according to some aspects of the present disclosure.

Generally, aspects of the disclosure are directed to techniques for reducing the risk of losing sales of an item in a retail store due to the item not being on the retail store's shelves for customers to purchase. The retail store's sales floor capacity for an item may be the maximum number of units of the item that is available on the retail store's sales floor at once for purchase, and may not include items that are in the stockroom. If the retail store's sales floor is fully stocked at the beginning of the day, so that the quantity of an item on the sales floor is equal to the sales floor capacity for the item, and if the item is not restocked during the day, then the sales floor capacity for the item may be equal to or greater than the daily level of demand for the item in order. It may be desirable for a retailer operating one or more retail store locations to set the floor capacity of a retail store for the item as close as possible to the daily demand in order to not risk losing sales of the item due to the item being out of stock on the sales floor.

The retail store's sales floor capacity for an item may be determined based on the number of facings in the retail store for the item. The number of facings for an item in a retail store may be the number of that item facing out towards customers in a particular retail store, including, e.g., the number of that item facing out towards customers on the retail store's standard fixture shelves and the number of that item facing out towards customers on the retail store's end cap fixtures. In some cases, the number of facings may be reflected in a store planogram, which is a visual representation of the presentation of various items on shelves or other fixtures within the store. The sales floor capacity for the item in the retail store can be determined based on the number of facings for the item and the facing capacity of each of the facings. For example, if an item has three facings in a retail store, and two of the facings have a facing capacity of ten items (e.g., the facing item plus nine additional items not in the customer's view like items stocked on a shelf behind the first item facing the customer) while the other one of the facings has a facing capacity of five items (e.g., the facing item plus four additional items not in the customer's view), then the item may have a sales floor capacity of 10 items+10 items+5 items=25 items in the retail store. By adjusting the minimum number of facings for an item, the retail store's sales floor capacity for the item can also be adjusted, thereby adjusting the ability for the retail store to meet the demand for the item. Based at least in part on historical sales data, items in a retail store that are at a specified risk of not being on the retail store's shelves during certain days can be identified, and the minimum number of facings for the item in the retail store can be determined, to decrease the risk of the item not being on the retail store's shelves.

Typically, the items that are at risk of not being on the retail store's shelves as well as the minimum number of facings for an item in a retail store may be determined on a monthly basis based on data from the same month in previous years, because the same month in different years may typically share similar sales patterns, including, e.g., seasonal or other demand fluctuations. Thus, for example, because November 2012 may experience a spike in sales on the day after Thanksgiving that is similarly reflected in the sales data from November 2011 or November 2010, the minimum number of facings to allocate for an item in November 2012 may be determined based on data collected in the month of November in past years, such as November 2011 or November 2010.

However, the minimum number of facings determined for an item in a specific month may not necessarily ensure that there is never a risk of the item being out-of-stock. For example, if the minimum number of facings is being determined for an item in November, the number of facings determined may not necessarily provide enough sales floor capacity for the item in order for the item to not be at risk of being out-of-stock on the sales floor during the day after Thanksgiving, because the demand for the item on that day may be much higher than the demand for the item in the rest of November. If the minimum number of facings for an item in November is determined to meet demand for the day after Thanksgiving, then there may be too many units of the item on the sales floor on other days in November, and those excess units of the item may crowd out other items on the sales floor, leading to those other items possibly being more frequently out-of-stock on the sales floor.

As such, examples according to this disclosure may provide techniques for identifying items that are at risk of being out-of-stock during days of a specified period and determining the minimum number of facings for those items at a retail store during the specified period. The minimum number of facings for an item may be determined so that the number of facings may strike a balance between providing sufficient retail floor capacity for the item to minimize days during the specified period where the item is at risk of the item being out of stock and not providing excessive retail floor capacity for the item.

FIG. 1 is a block diagram illustrating an example computing system according to some aspects of the present disclosure. As shown in FIG. 1, computing system 100 may include risk estimation module 102, facings determination module 104, and data report generation module 106. Computing system 100 may be made up of one or more computing devices, such as one or more server devices, and each of risk estimation module 102, facings determination module 104, and report generation module 106 may be applications that are executable on processors of the one or more computing devices making up computing system 100. Computing system 100 may communicate, via a network such as the Internet, with one or more external devices 110, such as external computing devices associated with retail stores like with a point-of-sale (POS) system some or all of which is located at one or more retail stores.

Items that may be at risk of not being on the retail store's shelves, or otherwise available to customers for purchase, during certain days of a specified period can be identified by determining a risk index for items in a retail store. Typically, the risk index may be determined on a monthly basis based on data for the item from the same month in previous years. Alternatively, the risk index may be determined for other periods of time, such as weeks, seasons, years, and the like. Risk estimation module 102 can determine a risk index for an item in the retail store to quantify such risk of not being on the retail store's shelves during certain days of a specified period of time (e.g., a specified month of the year) based on the frequency of the item selling beyond its retail floor capacity within a day during past periods of time (e.g., the same month in previous years) as well as the item's sales volatility during that same past periods of time. The risk index for the item may be determined based at least in part on the daily floor turnover of the item in the past periods of time. The daily floor turnover of the item may be the unit sales of the item that day divided by the sales floor capacity of the item for that day. If the daily floor turnover of the item is higher than 1.0, then the unit sales of the item exceeded the sales floor capacity of the item, thereby creating the potential of the item being out-of-stock on the sales floor during portions of that day. Data regarding the unit sales of the item and the sales capacity of the item may be received by risk estimation module 102 from one or more external devices 110 associated with the retail store. For example, risk estimation module 102 may retrieve or otherwise receive data regarding unit sales of an item from a POS system at or otherwise associated with the retail store. In one example, computing system 100 may store such data in one or more data stores (not shown).

The risk index for the item can be expressed as risk index=$\alpha_1$*incidence index+$\alpha_2$*volatility index, where $\alpha_1$ and $\alpha_2$ may be used to weigh the incidence index and the volatility index in determining the risk index, so that $\alpha_1+\alpha_2=1$. In one example $\alpha_1=\alpha_2=\frac{1}{2}$, so that risk index=$\frac{1}{2}$(incidence index+volatility index). The incidence index for the item in the retail store may represent how often the item's daily floor turnover exceeds 1 in a past time period, and may be quantified as the percentage of days in the retail store during the past periods of time where the item has a daily floor turnover that is greater than or equal to 1. The volatility index for the item in the retail store may represent the estimated chance of the item's daily floor turnover exceeding 1 due to volatility in sales of the item in the specified time period, and may be quantified as the probability that the item has a daily floor turnover that is greater than or equal to 1 in the same past periods of time, and may be calculated using a normal distribution of the daily floor turnover during the past period with parameters of mean=average(daily floor turnover) and standard deviation=Std Deviation(daily floor turnover). The incidence index, the volatility index, and the daily floor turnover may be calculated for the item using data over some or all days within a past period of time. Based on the calculated risk index, risk estimation module 102 can determine if or to what degree the item is at risk during the specified time period, with a higher risk index denoting a higher risk of the item not being on the retail store's shelves during certain days of the specified period.

In one example, risk estimation module 102 may compare the calculated risk index to a threshold index value and determine that the item is at risk during the time period if the calculated risk index is greater than or equal to the threshold value. For example, if the risk index for an item is about 0.15 or higher, then the item may be deemed to be at risk of not being available on the sales floor during peak sales day. A threshold risk index of 0.15 may be used in examples according to this disclosure in an attempt to determine a minimum number of facings for an item sold in a retail store that will make the risk of sales of the item exceeding the floor capacity 1 day per month, or, about 15% of the month. In one example, therefore, facings determination module 104 may determine a minimum number of facings for an item such that the risk index of an item selling beyond the floor capacity for the item and thereby not being available for purchase by customers is approximately 0.15.

In some examples, the risk index threshold for determining if an item is deemed to be at risk of not being available on the sales floor during peak sales days may be higher or lower than 0.15, where higher risk index thresholds may denote a higher standard for deeming if an item is at risk of not being available on the sales floor during peak sales days, and where lower risk index thresholds may denote a lower standard for deeming if an item is at risk of not being available on the sales floor during peak sales days. The risk index can be calculated for each item in a retail store, and a report can be generated containing the list of items in the retail store that is deemed to be at risk of not being available on the sales floor during peak sales days (e.g., items having a corresponding risk index of 0.15 or higher).

Because the space of a retail store is limited, it may not be practical to allocate a large number of facings for an item that is deemed at risk, so that the item remains in-stock on the retail store's shelves even during peak sales days. Instead, facings determination module 104 can determine the minimum number of facings for an item in a retail store in a particular month, so the retail store's sales floor capacity for the item is able to meet demand for the item equal to an amount of daily sales for the item that corresponds to a specified percentile of daily sales of the same item in the same month in past years, so that for a number of days in the month, e.g. the majority of days there is little to no risk of the item being out-of-stock on the retail store's shelves. For example, if facings determination module 104 determines that the minimum number of facings for the item in a particular month should provide sufficient retail capacity to meet demand for the item for 6 days out of a week, so that the item is at risk of selling out 1 day out of the week, then the demand that should be met by the retail store for an item may be equal to or greater than an amount of daily sales for the item that correspond to about the $85^{th}$ percentile of a normal distribution of the daily sales of the item during the same month in a previous year, which would correspond to a risk index of about 0.15. The percentile of the daily sales of the item in the same month of a previous year can be determined using statistical measures such as mean and standard deviation of a data sample with a normal distribution.

Facings determination module 104 may determine the minimum number of facings for an item at a retail store on a monthly basis based on the past sales data for the item in the same month in previous years. Thus, for example, to determine the minimum number facings for an item in November, facings determination module 104 may receive and use past sales data from previous Novembers in making the determination of the minimum number of facings for the item at the retail store. If, for example, facings determination module 104 determines the minimum number of facings for an item more than one month at a time (e.g., on a bi-monthly basis), then facings determination module 104 can determine the minimum number of facings separately for each month, and facings determination module 104 can average together the minimum number of facings for each month to determine the minimum number of facings for the item in that multi-month period.

The minimum number of facings for an item in a particular month may be equal to or greater than the number of daily sales of the item at the specified percentile of daily sales of the item (e.g., $85^{th}$ percentile of the normal distribution of daily sales of the item, which correspond to daily sales that is equal to or greater than 85% of the daily sales of the item in a normal distribution) in the same month in past years divided by the average maximum number of items per facing. The average maximum number of items per facing may equal the average daily capacity for the item (e.g., the total number of the item on the retail store's shelves) during similar periods in the past (e.g., the same month in a previous year) divided by the average number of facings for the item during similar periods in the past (e.g., the same month in a previous year).

The average number of facings for the item during a specified period may be determined based on a weighted average of home location facings for the item and sales plan facings for the item. The home location facings for the item may be facings at the item's normal location on the retail store's shelves, while the sales plan facings for the item may be facings for the item at other locations in the retail store (e.g., end cap displays). Because home location facings for the item may typically exist for the entirety of the specified period, while sales plan facings may typically provide temporary capacity for the item for only a subset of the specified period, home location facings may be more heavily weighed than sales plan facings. For example, if sales plan facings exist during only half of the specified period while the home location facings exist for the entirety of the specified period, then the number of facings may weigh the sales plan facing as half of the home location facing. The average daily capacity for the item during the specified period may be determined by summing up the daily capacity for the item during the specified period and dividing the sum by the total number of days in the specified period.

Figure 2:
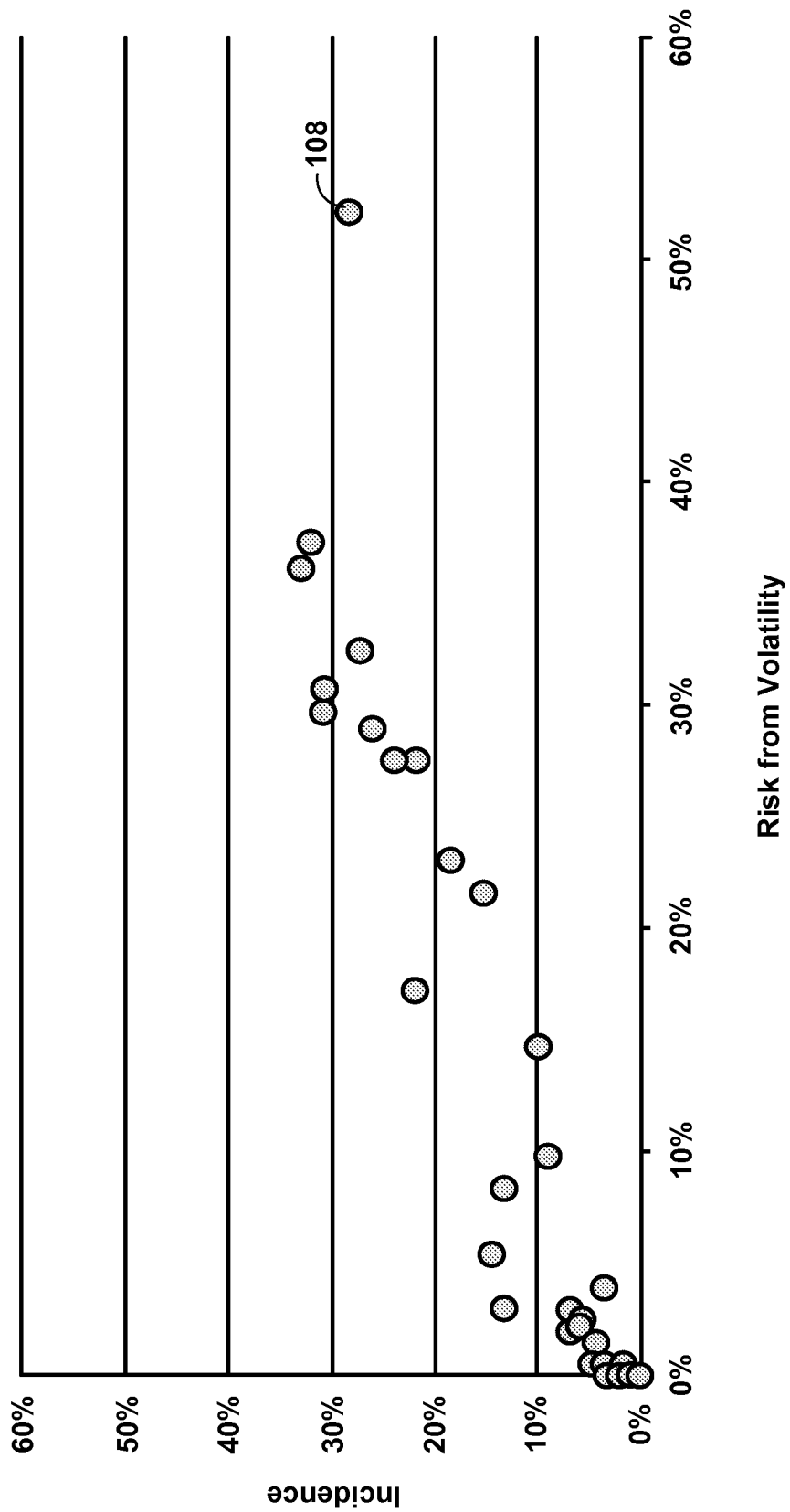
FIG. 2 is a graph illustrating average daily sales vs. an overall risk index for example items according to some aspects of the present disclosure.

FIG. 2 is a graph illustrating an incidence index vs. a volatility index for example items according to some aspects of the present disclosure. As shown in FIG. 2, the incidence axis represents how often an item's daily floor turnover exceeds 1 in a certain time period, and the risk from volatility axis indicates the estimated chance of the item's daily floor turnover exceeds 1 due to volatility in sales of the item in that same time period. For example, item 108 may have an incidence of 29% and a risk from volatility of 52%. Thus, the risk index for item 108 may be determined, e.g., by risk estimation module 102 as ½(incidence+risk from volatility)=40%. Because the risk index for item 108 exceeds 15%, then item 108 may be considered to be at risk of not being on store shelves of the retail store during certain days. As such, in one example, facings determination module 104 may determine that the minimum number of facings for item 108 needs to be increased from that used in the previous time periods.

Figure 3:
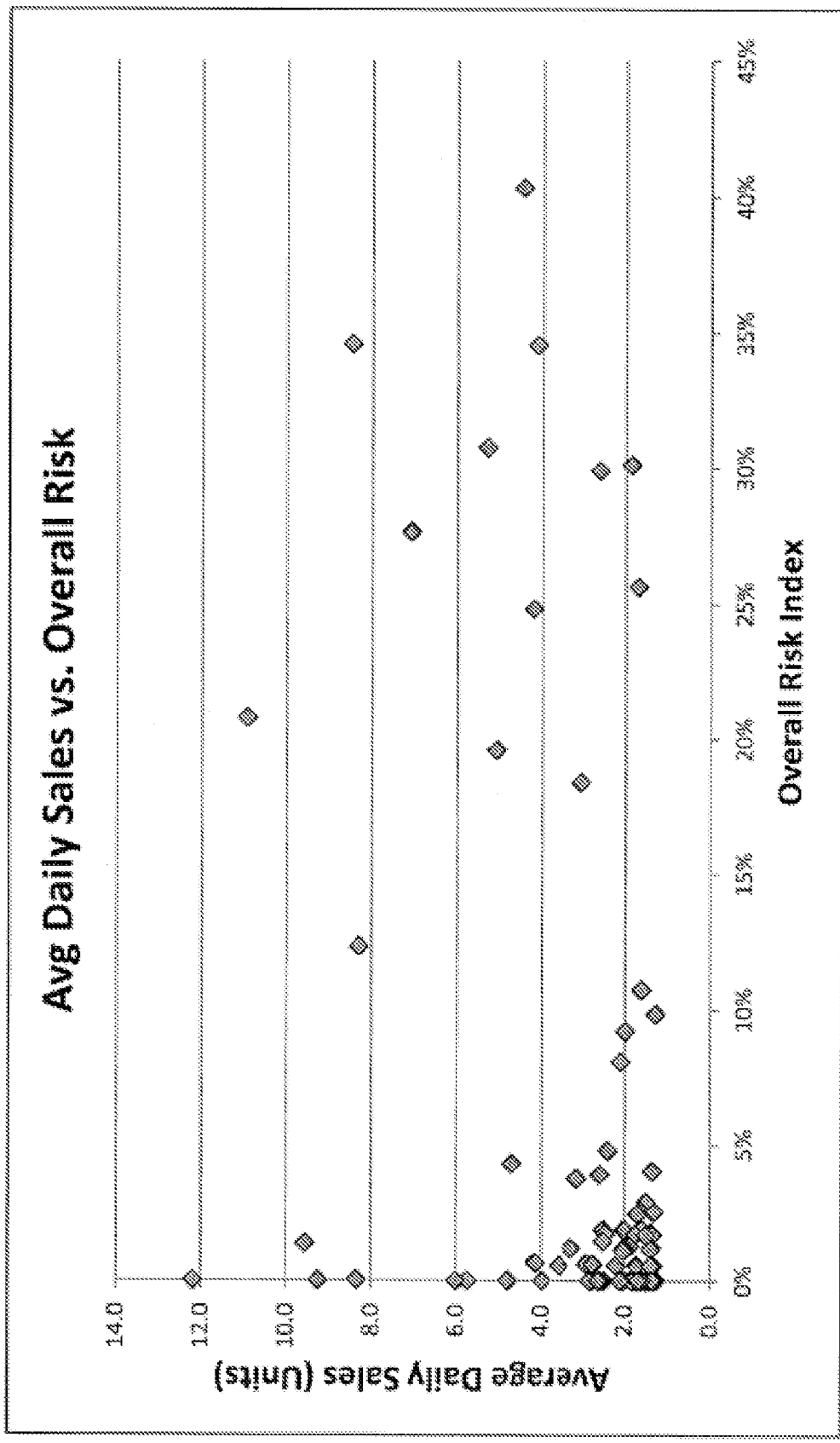
FIG. 3 is a graph illustrating an incidence index vs. a volatility index for example items according to some aspects of the present disclosure.

FIG. 3 is a graph illustrating average daily sales vs. an overall risk index for example items according to some aspects of the present disclosure. As shown in FIG. 3, while the risk index for an item generally increases as the item's average daily sales increases, there may be some items that have relatively lower average daily sales while still having a relatively higher overall risk index (e.g., equal or greater than 15%). Thus, average daily sales of an item alone may be an unreliable indicator of the minimum number of facings for an item. In contrast, the embodiments described herein, items having relatively lower average daily sales and relatively higher overall risk index may be allocated an increased number of facings to alleviate the risk associated with those items.

Data regarding historical sales data of the item, the number of facings for the item, and the daily capacity for the item may be received by facings determination module 104 from one or more external devices 110 associated with the retail store, including, e.g., a POS system of the retail store. Alternatively, computing system 100 may store such data in one or more data stores (not shown).

Report generation module 106 may generate a report including the minimum number of facings determined for the item, and report generation module 106 may provide the generated report to the retail store, such as by communicating the report to one or more external devices 110 associated with the retail store. Alternatively, generation module 106 may store the report in a data store in computing system 100 that is accessible by computing devices and/or employees at the retail store. The retail store may act on the generated report by setting the number of facings for the item to the minimum number of facings included in the report. For example, if the number of facings allocated for the item by the retail store was less than the minimum number of facings recommended in the report, the retail store may increase the number of facings for the item to the minimum number of facings recommended in the report. Conversely, if the number of facings allocated for the item by the retail store was more than the minimum number of facings recommended in the report, the retail store may decrease the number of facings for the item to the minimum number of racings recommended in the report.

Figure 4:
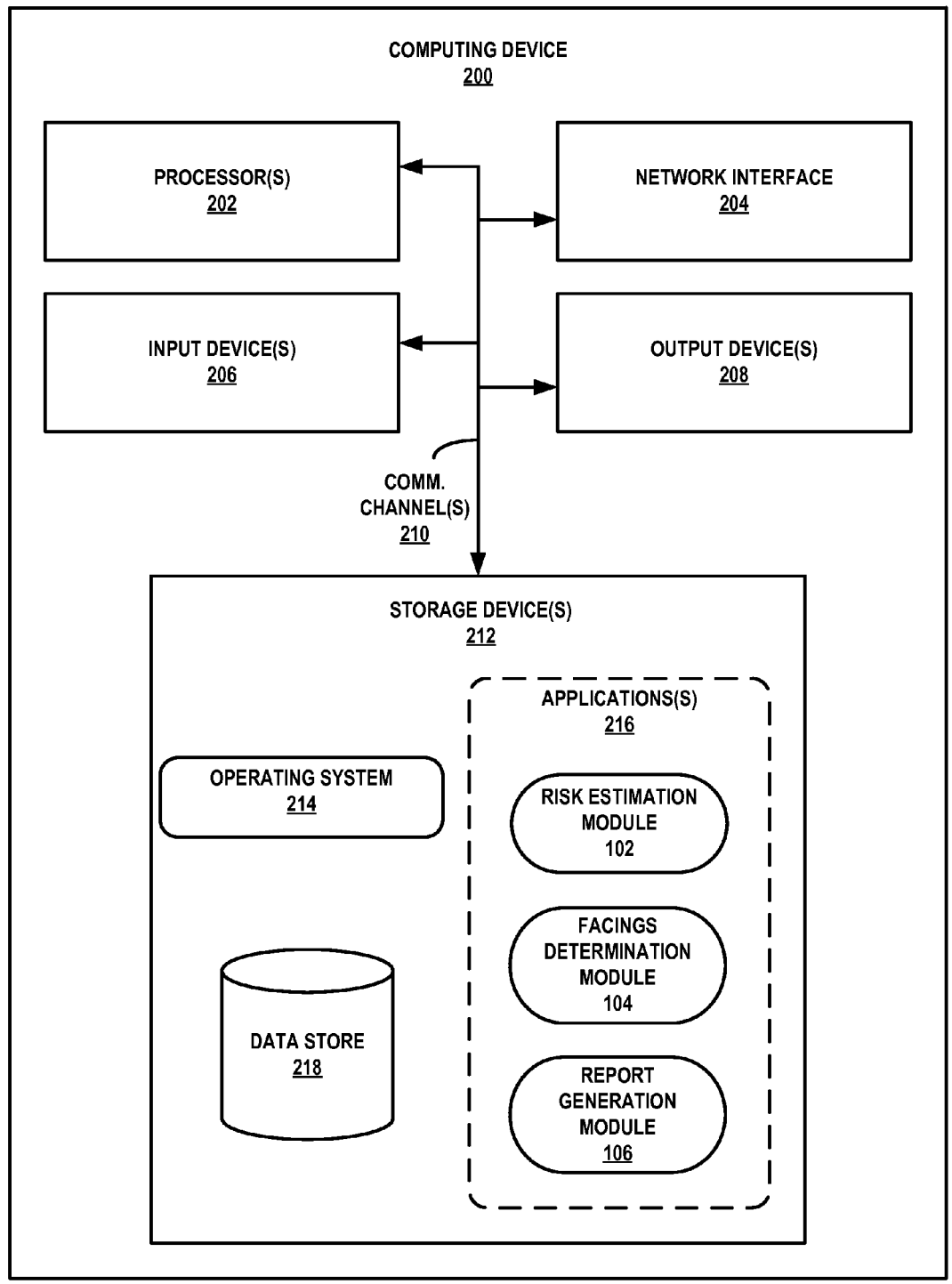
FIG. 4 is a block diagram illustrating an example computing device according to some aspects of the present disclosure.

FIG. 4 is a block diagram illustrating an example computing device, such as one of the one or more computing devices making up computing system 100, according to some aspects of the present disclosure. As shown in the example of FIG. 4, computing device 200 may include one or more processors 202, network interface 204, one or more storage devices 212, one or more input devices 206, and one or more output devices 208. Computing device 200 may also include operating system 214 that is executable by computing device 200. Computing device 200, in one example, further includes applications 216 that are also executable by computing device 200. Each of components 202, 204, 206, 208, and 212, may be interconnected (physically, communicatively, and/or operatively) by communication channels 210 for inter-component communications.

One or more processors 202, in one example, may be configured to implement functionality and/or process instructions for execution within computing device 200. For example, one or more processors 202 may be capable of processing instructions stored on one or more storage devices 212.

Computing device 200, in some examples, may also include network interface 204. Computing device 200, in one example, may use network interface 204 to communicate with external devices via one or more networks, such as one or more wireless networks. Network interface 204 may be a network interface card, such as an Ethernet card, an optical transceiver, a radio frequency transceiver, or any other type of device that can send and receive information. Other examples of such network interfaces may include Bluetooth®, 3G and WiFi® radios in mobile computing devices as well as USB. In some examples, computing device 200 utilizes network interface 204 to wirelessly communicate with an external device.

Computing device 200, in one example, may also include one or more input devices 206. One or more input devices 206, in some examples, may be configured to receive input from a user through tactile, audio, or video feedback. Examples of one or more input devices 206 may include a presence-sensitive screen like a touchscreen display, a mouse, a keyboard, a voice responsive system, video camera, microphone or any other type of device for detecting a command from a user.

One or more output devices 208 may also be included in computing device 200. One or more output devices 208, in some examples, may be configured to provide output to a user using tactile, audio, or video stimuli. One or more output devices 208, in one example, may include a presence-sensitive screen like a touchscreen display, a sound card, a video graphics adapter card, or any other type of device for converting a signal into an appropriate form understandable to humans or machines. Additional examples of one or more output devices 208 may include a speaker, a cathode ray tube (CRT) monitor, a liquid crystal display (LCD), or any other type of device that can generate intelligible output to a user.

In some examples, computing device 200 may include one or more storage devices 212. One or more storage devices 212, in some examples, may include one or more computer-readable storage media. One or more storage devices 212 may further be configured for long-term storage of information. In some examples, one or more storage devices 212 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

In some examples, one or more storage devices 212 may also include memory. Memory may be described as a computer-readable storage medium. In some examples, memory may be a temporary memory, meaning that a primary purpose of memory is not long-term storage. Memory, in some examples, may be described as a volatile memory, meaning that memory does not maintain stored contents when the computer is turned off. Examples of volatile memories may include random access memories (RAM), dynamic random access memories (DRAM), static random access memories (SRAM), and other forms of volatile memories known in the art. In some examples, memory may be used to store program instructions for execution by one or more processors 202. Memory, in one example, may be used by software or applications running on computing device 200 (e.g., one or more applications 216) to temporarily store information during program execution.

Computing device 200 may include operating system 214. Operating system 214, in some examples, may control the operation of components of computing device 200. For example, operating system 214 may facilitate the interaction of one or more applications 216 (e.g., risk estimation module 102, facings determinations module 104, or report generation module 106) with one or more processors 202, network interface 204, one or more storage devices 212, one or more input devices 206, and one or more output devices 208.

As shown in FIG. 4, computing device 200 may include risk estimation module 102, facings determinations module 104, and report generation module 106. Risk estimation module 102, facings determinations module 104, and report generation module 106 may each include program instructions and/or data that are executable by computing device 200. For example, risk estimation module 102, facings determination module 104, and report generation module 106 may each include instructions that cause computing device 200 to perform one or more of the operations and actions described in the present disclosure. Although not shown, each of components 210, 214, 216, and 200, may be interconnected (physically, communicatively, and/or operatively) by communication channels for inter-component communications.

According to some aspects of the present disclosure, risk estimation module 102 may determine the risk of an item not being on store shelves of a retail store during certain days by determining a risk index for the item at the retail store. Risk estimation module 102 may receive data regarding the sales volatility of the item and data regarding the frequency of the item selling beyond its sales floor capacity within a day and may determine the risk index based on the data. Such data may be retrieved from data store 218, or may be communicated by an external device (not shown), such as a computing device at the retail store, to risk estimation module 102 via network interface 204. Based on the received data, risk estimation module 102 may generate a risk index for the item to quantify the risk of the item not being available on store shelves during certain days. Based on the risk index, risk estimation module 102 may enable report generation module 106 to generate a report including an indication of whether the item is at risk of not being on store shelves of the retail store during certain days.

According to some aspects of the present disclosure, facings determination module 104 may determine the minimum number of facings for an item at a retail store that is determined by risk estimation module 102 as being at risk of not being on store shelves during certain days. Facings determination module 104 may receive data regarding the average daily capacity of the item in the past period of time, the average number of facings for the item in the past period of time, and data regarding sales of the item in the past period of time. Such data may be retrieved from data store 218, or may be communicated by an external device (not shown), such as a computing device at the retail store, to risk estimation module 102 via network interface 204. Based on the received data, facings determination module 104 may determine the minimum number of facings for the item at the retail store, and facings determination module 104 may enable report generation module 106 to generate a report that includes an indication of the minimum number of facings that is recommended for the item at the retail store.

According to some aspects of the present disclosure, report generation module 106 may generate reports indicating whether the item is at risk of not being on store shelves of the retail store during certain days as well as indicating the minimum number of facings that is recommended for the item at the retail store. The report generated by the report generation module 106 may be electronic documents that are stored in data store 108. Alternatively, report generation module 106 may communicate via network interface 204 with external devices (not shown), such as a computing device associated with the retail store in question, so that an employee working at the retail store may be able to change the number of facings allocated to the item in question at the retail store based on the report.

Figure 5:
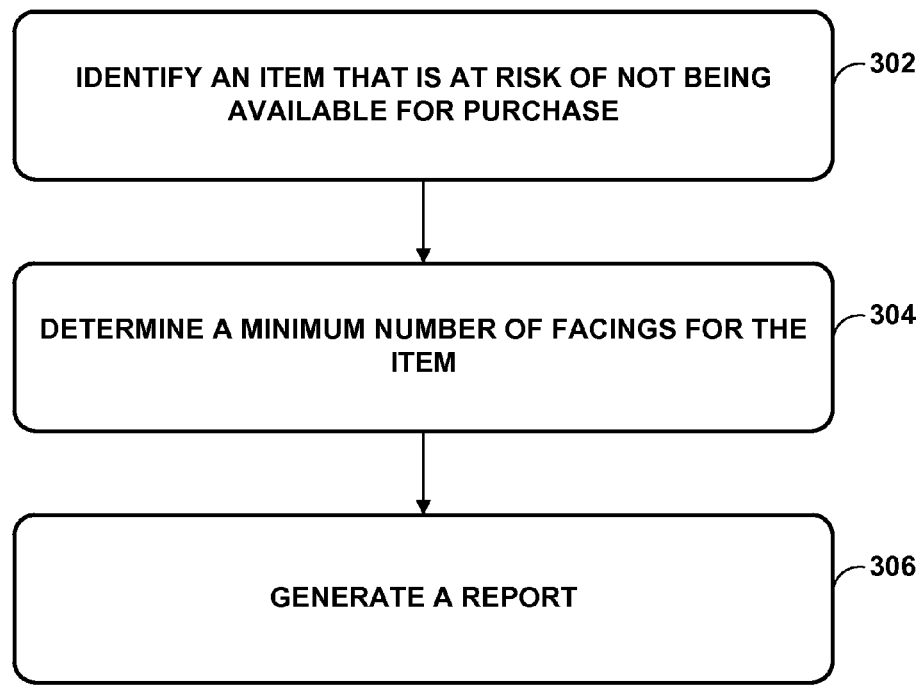
FIG. 5 is a flow chart illustrating an example process of determining the number of facings for an item at a retail store in accordance with some aspects of the present disclosure.

FIG. 5 is a flow chart illustrating an example process of determining the number of facings for an item at a retail store in accordance with some aspects of the present disclosure. The process may include identifying, e.g., by risk estimation module 102, an item at a retail store that is at risk of not being on store shelves of the retail store during certain days of a specified period of time based at least in part on a sales volatility of the item in a past period of time and on a frequency of the item selling beyond its sales floor capacity within a day in the past period of time (302). The process may further include determining, e.g., by the facings determination module 104, a minimum number of facings for the item in the retail store for the specified period of time based at least in part on an average daily capacity of the item in the past period of time, an average number of facings for the item in the past period of time, and a specified amount of daily sales of the item (304). The process may further include reporting, by the report generation module 106, the determined minimum number of facings for the item in the retail store (306).

In some examples, determining the minimum number of facings for the item in the retail store may further include determining, by the facings determination module 104, the minimum number of facings so that it is greater than or equal to the specified amount of daily sales of the item multiplied by the average number of facings in the past period of time divided by the average daily capacity of the item in the past period of time. In some examples, determining the minimum number of facings for the item in the retail store may further include determining the average number of facings for the item in the past period of time based on a weighted average of home location facings for the item and sales plan facings for the item. In some examples, the specified amount of daily sales of the item may be a specified percentile of daily sales of the item in the past period of time. In some examples, the specified percentile may be about an $85^{th}$ percentile of daily sales of the item in the past period of time.

In some examples, the specified period may be a month of a year, and the past period of time may be the month in one or more years previous to the year. In some examples, identifying the item that is at risk further includes determining a risk index for the item, wherein the risk index=½(incidence index+volatility index), wherein a daily floor turnover is unit sales of the item divided by the sales floor capacity of the item, wherein the incidence index is a percentage of days during the past period of time with the daily floor turnover for the item being bigger than or equal to 1, and wherein the volatility index is a probability during the past period of time of the daily floor turnover for the item being bigger than or equal to 1. In some examples, identifying the item that is at risk may further include determining that the item is at risk if the risk index is equal to or greater than 0.15. In some examples, the process may further include changing a number of facings for the item at the retail store to the determined minimum number of facings.

Figure 6:
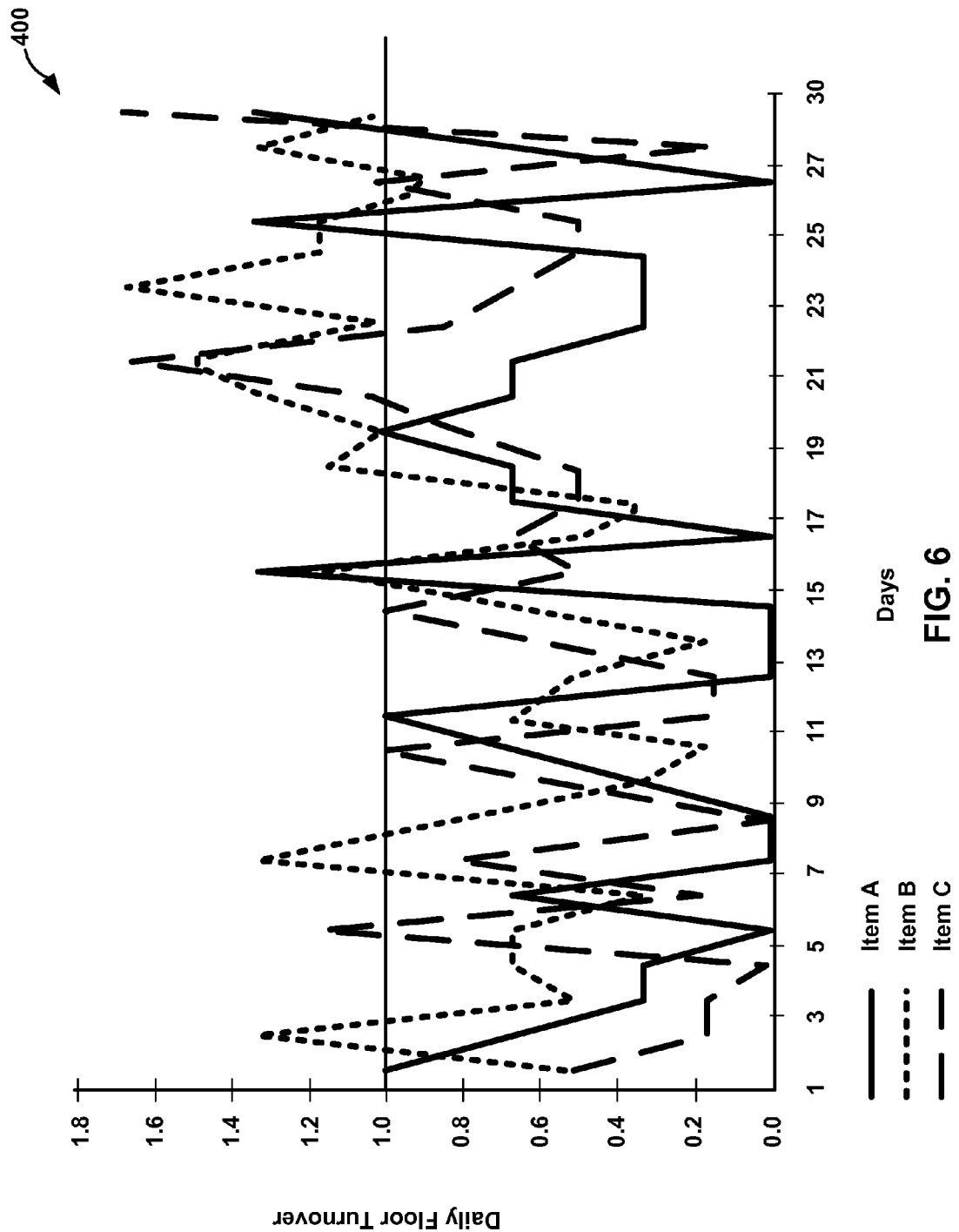
FIG. 6 is a graph illustrating an example daily floor turnover for items at a retail store during a period of time according to some aspects of the present disclosure.

FIG. 6 is a graph illustrating an example daily floor turnover for items at a retail store during a period of time according to some aspects of the present disclosure. As shown in FIG. 6, the daily floor turnover for each of the three items plotted in graph 400 over the span of a month may frequently reach above 1.0. Furthermore, the daily floor turnover for the three items may also be highly volatile, as the daily floor turnover may frequently reach above 1.0 and then fall to near 0.0. Thus, each of the three items plotted in graph 400 may be considered items that are at high risk of not being on store shelves of the retail store during certain days of the time period represented in graph 400. Item A in FIG. 6 exceeds 1 daily floor turnover three times in the month. In one example, risk estimation module 102 may determine that a daily floor turnover of three times per month corresponds to a risk index that is greater than a threshold, e.g., a threshold of 0.15. In such a case, facings determination module 104 may recommend an increase in facings for Item A. The risk indexes and minimum facings for Items B and C may also be determined by risk estimation module 102 and facings determination module 104, respectively, to determine whether or not to change the number of facings for the item in the retail store.

FIG. 7 is a graph illustrating an example daily floor turnover for items at a retail store during a period of time according to some aspects of the present disclosure. As shown in FIG. 7, the daily floor turnover for each of the three items plotted in graph 500 over the span of a month never goes above 1.0. Thus, each of the three items plotted in graph 500 may be considered items that are at low risk of not being on store shelves of the retail store during certain days of the time period represented in graph 400. However, because, e.g., Item A in FIG. 7 is under 1 daily floor turnover all of the days of the month. In one example, risk estimation module 102 and facings determination module 104 may determine that the risk index and the corresponding number of facings for Item A needs to be adjusted such that the item is not overstocked at the retail store. In one example, facings determination module 104 may determine that the minimum number of facings for Item A should be reduced such that the daily floor turnover increases to closer to 1 on some or all of the days of the month. The risk indexes and minimum facings for Items B and C may also be determined by risk estimation module 102 and facings determination module 104, respectively, to determine whether or not to change the number of facings for the item in the retail store.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer-readable medium, such as a computer-readable storage medium, containing instructions. Instructions embedded or encoded in a computer-readable medium, including a computer-readable storage medium, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media. In some examples, an article of manufacture may comprise one or more computer-readable storage media.

In some examples, computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

As used throughout this disclosure, headings are included to improve the clarity of the disclosure and are not used to define separate examples. In some examples, features of various examples may be combined and/or used from among multiple headings.

Various examples have been described. These and other examples are within the scope of the following claims.

The invention claimed is:

1. A method comprising:
identifying, by a computing system, an item at a retail store that is at risk of not being available for purchase by a customer at the retail store based at least in part on a sales volatility of the item in a past period of time and on a frequency of the item selling beyond a sales floor capacity for the item within a day in the past period of time;
determining, by the computing system, a minimum number of facings for the item in the retail store for a specified period of time based at least in part on an average daily capacity of the item in the past period of time, an average number of facings for the item in the past period of time, and a specified amount of daily sales of the item; and
reporting, by the computing system, the determined minimum number of facings for the item in the retail store.

2. The method of claim 1, wherein determining the minimum number of facings for the item in the retail store further comprises:
determining the minimum number of facings so that the minimum number of facings is greater than or equal to the specified amount of the daily sales of the item multiplied by the average number of facings in the past period of time divided by the average daily capacity of the item in the past period of time.

3. The method of claim 2, further comprising:
determining the average number of facings for the item in the past period of time based on a weighted average of home location facings for the item and sales plan facings for the item.

4. The method of claim 2, wherein the specified amount of the daily sales of the item is a specified percentile of the daily sales of the item in the past period of time.

5. The method of claim 4, wherein the specified percentile is about an $85^{th}$ percentile of the daily sales of the item in the past period of time.

6. The method of claim 1, wherein:
the specified period is a month of a year, and
the past period of time is the month in one or more years previous to the year.

7. The method of claim 1, wherein identifying the item that is at risk comprises:
determining a risk index for the item, wherein the risk index=½(incidence index+volatility index);
wherein a daily floor turnover is unit sales of the item divided by the sales floor capacity of the item;
wherein the incidence index is a percentage of days during the past period of time with the daily floor turnover for the item being bigger than or equal to 1; and
wherein the volatility index is a probability during the past period of time of the daily floor turnover for the item being bigger than or equal to 1.

8. The method of claim 7, further comprising:
determining that the item is at risk if the risk index is equal to or greater than 0.15.

9. The method of claim 1 further comprising:
changing a number of facings for the item at the retail store to the determined minimum number of facings.

10. The method of claim 1, wherein the risk of the item not being available for purchase by a customer comprises a risk that the item will not be available in at least one location at the retail store accessible by a customer.

11. A computer-readable storage medium comprising instructions that, when executed on at least one programmable processor, causes the programmable processor to perform operations, the operations comprising:
calculating a risk index for an item at a retail store that is indicative of a risk that the item will not be available for purchase by a customer at the retail store;
determining a minimum number of facings for the item in the retail store for a specified period of time based at least in part on the risk index for the item, an average daily capacity of the item in the past period of time, an average number of facings for the item in the past period of time, and a specified amount of daily sales of the item; and
changing a planned number of facings for the item at the retail store to at least the determined minimum number of facings if the risk index is equal to or greater than a threshold risk index value.

12. The computer-readable storage medium of claim 11, wherein determining the minimum number of facings for the item in the retail store further comprises:
determining the minimum number of facings so that the minimum number of facings is greater than or equal to the specified amount of the daily sales of the item multiplied by the average number of facings in the past period of time divided by the average daily capacity of the item in the past period of time.

13. The computer-readable storage medium of claim 12, wherein the operations further comprise:
determining the average number of facings for the item in the past period of time based on a weighted average of home location facings for the item and sales plan facings for the item.

14. The computer-readable storage medium of claim 12, wherein the specified amount of the daily sales of the item is a specified percentile of the daily sales of the item in the past period of time.

15. The computer-readable storage medium of claim 14, wherein the specified percentile is about an $85^{th}$ percentile of the daily sales of the item in the past period of time.

16. The computer-readable storage medium of claim 11, wherein:
the specified period is a month of a year, and
the past period of time is the month in one or more years previous to the year.

17. The computer-readable storage medium of claim 11, wherein calculating the risk index for the item comprises calculating the risk index based at least in part on a sales volatility of the item in a past period of time and on a frequency of the item selling beyond a sales floor capacity for the item within a day in the past period of time.

18. The computer-readable storage medium of claim 17, wherein the risk index=½(incidence index+volatility index);
wherein a daily floor turnover is unit sales of the item divided by the sales floor capacity of the item;
wherein the incidence index is a percentage of days during the past period of time with the daily floor turnover for the item being bigger than or equal to 1; and
wherein the volatility index is a probability during the past period of time of the daily floor turnover for the item being bigger than or equal to 1.

19. The computer-readable storage medium of claim 18, wherein changing the number of facings for the item at the retail store comprises:
changing the number of facings for the item at the retail store to the determined minimum number of facings if the risk index is equal to or greater than 0.15.

20. A system comprising:
at least one processor;
a risk estimation module operable on the at least one processor and configured to identify an item at a retail store that is at risk of not being on store shelves of the retail store during certain days of a specified period of time based at least in part on a risk index indicative of a risk that demand for the item will exceed the number of items on store shelves of the retail store
a facings determination module operable on the at least one processor and configured to determine a minimum number of facings for the item in the retail store for a specified period of time based at least in part on the risk index, an average daily capacity of the item in the past period of time, an average number of facings for the item in the past period of time, and a specified amount of daily sales of the item; and
a report generation module operable on the at least one processor and configured to generate a report comprising the determined minimum number of facings for the item in the retail store and a recommendation to change a number of facings for the item at the retail store to at least the determined minimum number of facings if the risk index is equal to or greater than a threshold risk index value.

* * * * *